United States Patent [19]

Bower

[11] Patent Number: 4,544,694

[45] Date of Patent: Oct. 1, 1985

[54] EXTRUSION LUBRICANT COMPOSITION AND PROCESS

[75] Inventor: J. David Bower, Long Valley, N.J.

[73] Assignee: American Hoechst Corporation, Somerville, N.J.

[21] Appl. No.: 620,534

[22] Filed: Jun. 14, 1984

Related U.S. Application Data

[63] Continuation of Ser. No. 453,381, Dec. 27, 1982, abandoned.

[51] Int. Cl.$^4$ ............................ C08K 5/05; C08K 5/04; C08L 91/00
[52] U.S. Cl. ..................................... 524/385; 106/268; 524/386; 524/387; 524/388; 524/394; 524/487
[58] Field of Search ................................ 524/385–388, 524/394, 487; 106/268

[56] References Cited

U.S. PATENT DOCUMENTS

| | | | |
|---|---|---|---|
| 1,932,643 | 10/1933 | Schrauth | 252/315.4 |
| 2,151,641 | 3/1939 | Myers | 252/40.5 |
| 2,334,239 | 11/1943 | Barnett et al. | 252/39 |
| 2,769,781 | 11/1956 | Butcosk | 252/40 |
| 2,801,971 | 8/1957 | Bartlett et al. | 252/41 |
| 3,285,868 | 11/1966 | Hecker et al. | 524/388 |
| 3,468,677 | 9/1969 | Weingaertner | 106/10 |
| 3,471,403 | 10/1969 | Le Suer | 252/39 |
| 3,883,362 | 5/1975 | Yates | 106/268 |
| 3,883,363 | 5/1975 | Yates et al. | 106/268 |
| 3,941,606 | 3/1976 | Cullins et al. | 106/243 |
| 3,953,358 | 4/1976 | Sjögreen | 524/388 |
| 3,979,345 | 9/1976 | Yates et al. | 106/268 |
| 3,986,995 | 10/1976 | Yates et al. | 106/268 |
| 4,029,682 | 6/1977 | Foulks | 260/414 |
| 4,218,353 | 4/1980 | Kim | 106/270 |
| 4,244,746 | 1/1981 | Washecheck | 106/268 |
| 4,246,150 | 1/1981 | Bower | 106/270 |
| 4,248,747 | 2/1981 | Washecheck | 524/277 |
| 4,283,314 | 8/1981 | Zeilstra et al. | 260/23 |

*Primary Examiner*—Theodore Morris
*Attorney, Agent, or Firm*—Kenneth P. Glynn; James C. Lydon; Michael J. Tully

[57] ABSTRACT

Compositions of matter and processes for making the compositions of matter are described. The compositions are extrusion lubricant compositions and may be prepared by either combining appropriate initial components in predetermined amounts, or forming a homogeneous melt of a fatty acid, e.g. stearic acid, and one or more polar substances, e.g., a fatty alcohol or polyalcohol, adding a metal base material to form the metal salt of the fatty acid in situ, and adding one or more waxes such as microwaxes, paraffins and/or alpha-olefins to the mixture. The compositions are effective lubricants used in heat processing of vinyl chloride resin compositions.

15 Claims, No Drawings

EXTRUSION LUBRICANT COMPOSITION AND PROCESS

This application is a continuation of U.S. patent application Ser. No. 06/453,381, filed Dec. 27, 1982, and now abandoned.

BACKGROUND OF THE INVENTION

1. Field of Invention

The present invention is directed to compositions of matter and to processes for producing the compositions of matter. More specifically, the present invention is directed to processes of making compositions of matter which are useful in the lubrication of various plastic extrusions. One process involves the production of specified fatty acid metal salts in situ in the presence of selected polar substances during the preparation of the composition. Hydrocarbon waxes (polyethylene waxes, microwaxes, paraffins and/or alpha-olefins) are added to the composition to produce a suitable lubricant composition. Another process of the present invention involves preparation of the composition by combining predetermined amounts of one or more specified fatty acid metal salts, selected polar alcohols and optionally small amounts of a fatty acid, polyethylene waxes, microwaxes, paraffins and/or alpha-olefins. Both processes of the present invention yield compositions which may be added to plastic extrusion materials to enhance the lubricity thereof during extrusion. The compositions of matter of this invention are especially useful for those plastics requiring addition of lubricants to render them processable, such as polyvinyl chloride (PVC), chlorinated polyvinyl chloride (CPVC), polyvinylidene chloride (PVDC) and copolymers thereto.

2. Prior Art Statement

PVC compositions and other thermoplastic extrusion compositions have been advantageously extruded with various types of extrusion aids (microingredients) which are well known in the art. One type of well known extrusion aid (extrusion lubricant composition) contains paraffinic hydrocarbon waxes admixed with calcium salts of specific fatty acids such as calcium stearate. These additives are customarily preblended with thermoplastic extrusion compositions, such as PVC resin, prior to extrusion. To facilitate blending, it is preferable that the additives be in a solid free-flowing form as either flakes, granules, powders or prills. Solids in any of these forms are easier to weigh out and transfer to the mixer for each batch blended. It is also desirable to combine various components into one product in order to reduce the number of weighings required for each batch of thermoplastic resin blended. The paraffinic and polyethylene waxes can be melted together and flaked, granulated, prilled or powdered. The calcium stearate component, however, is not compatible with the waxes and cannot be simply blended together. The calcium stearate is commonly supplied as a powder. Physically blending the calcium stearate with a wax in powder form would result in separation of the two during handling because of differences in particle size and density.

Calcium stearate can be made compatible in paraffinic waxes by heating to temperatures in excess of 150° C. as taught in Conoco's U.S. Pat. No. 3,883,362; 3,883,363; 3,979,345; 3,986,995 and 4,248,747. As taught therein, the calcium stearate may be an initial component or may be formed in situ. A uniform friable melt is obtained whether or not the calcium stearate is formed in situ rendering a partial solution to the problem. The disadvantages of these methods include the high temperatures needed which can not be readily achieved by conventional steam heating except through high pressure lines, electrical heaters, or oil heat exchangers, which are not available to many processors and result in high energy consumption. Another disadvantage which occurs, even when the calcium stearate is formed in situ by these prior art methods, is the high viscosity which results when the calcium stearate goes into the wax, making the processing and handling of the finished product difficult.

Another procedure for incorporating calcium stearate into paraffinic waxes involves the precipitation thereof from water, as described in Malinckrodt's U.S. Pat. No. 3,909,472. This method has disadvantages in that excess handling is required and high energy consumption occurs. The waxes and free acid are melted in a kettle and transferred to a separate kettle containing the water/calcium base slurry. Excess energy is consumed in heating the water and in drying the precipitated product. This basic procedure is likewise utilized for the production of pure calcium stearate (no wax used) in the Norac U.S. Pat. No. 3,803,188, and lead stearates in U.S. Pat. No. 2,650,932.

In yet other methods, an aqueous dispersion can be prepared as described by American Hoechst Corporation's U.S. Pat. Nos. 4,040,996 and 4,040,997, for example. However, such dispersions have the disadvantages of longterm unstability, high shipping costs if water dispersion is shipped, and complicated production procedures and high energy consumption if the product is coated on a filler and dried.

SUMMARY OF THE INVENTION

It has now been discovered that selected fatty acid metal salts, exemplified here by calcium stearate, may be incorporated into non-polar microwaxes, paraffins and/or alpha-olefins if additional polar components are present. In the present invention, the salt, e.g. calcium stearate, may be incorporated into wax melts by an in situ method of reacting stearic acid with a calcium base. Alternatively, calcium stearate may be added as an initial component. In one prior art method, attempts to prepare a 30% calcium stearate blend with non-polar waxes resulted in compositions with acid numbers (ASTM D 1386) of at least 16 representing only a 70% reaction of the stearic acid in the blend. Lower acid numbers were desired but not achieved without higher viscosities. High viscosity melts can not be readily handled by conventional equipment for flaking or prilling. Thus, where the prior art methods resulted in lower acid numbers, viscosity problems were encountered.

It has been found that by the utilization of selected polar substances such as fatty alcohols, the extent of reaction of the fatty acid, e.g. stearic acid, with the metal base may be increased as reflected by infrared analysis or by the achievement of acid numbers below 16 and even as low as 5 (2.5% free fatty acid), without creating significant viscosity problems. Reduction of residual fatty acid while maintaining a low viscosity in accordance with the present invention offers the following advantages: (1) The product may be flaked, prilled, granulated or powdered using conventional equipment used to process waxes; (2) temperatures above 150° C. are not required; (3) reduced fatty acid levels, e.g. stearic acid, which has an external lubricating effect, does not negate the internal lubricity effects of the metal stearate; (4) the polar substances, e.g. the fatty alcohols or polyalcohols, have an internal lubricating effect which enhances the metal stearate effects; (5) the metal stearate, e.g., calcium stearate, may be uniformly dispersed in hydrocarbon waxes, such as microwaxes, paraffins and alpha-olefins, which improves the efficiency as a thermoplastic resin lubricant by providing a more uniform dispersion when blended in the thermoplastic resin, e.g., PVC; and (6) dispersion of the fatty acid salt, e.g., calcium stearate in the polar substance reduces the tendency of the salt to absorb moisture which can be detrimental in some applications.

Advantageously, the processes for preparing the lubricants of this invention can be carried out at lower temperatures and with more complete utilization of the starting materials than is taught in the prior art.

DETAILED DESCRIPTION OF THE PRESENT INVENTION AND THE EXAMPLES

In accordance with the processes of the present invention, single package, free-flowing, friable compositions of matter are obtained for addition to thermoplastic extrusion compositions to enhance lubricity during the extrusion process, and for other applications as well.

The processes of the present invention involve multistep procedures in which a fatty acid metal salt as generated in situ, or a fatty acid metal salt in combination with additional fatty acid, can be incorporated directly into a specified wax melt.

The term fatty acid as used herein is intended to encompass alkyl acids having from 12 to 30 carbon atoms in the molecular chain, including but not limited to lauric, palmitic, stearic, behenic and montanic acids. The most preferred of such acids is stearic acid and its most nearly functional equivalents.

The stearic acid or other acids which are utilized in the process of the present invention may be used in commercially available form. For example, stearic acid having a congealing point (ASTM D 938) of 50°–55° C. and an acid number (ASTM D 1386) of 195–205, and which is available commercially, may be employed.

The metallic base materials used herein for the in situ generation of the fatty acid salt encompass an oxide or hydroxide of a Group II metal or lead, such as oxides and hydroxides of calcium, magnesium, barium, zinc, cadmium or lead. Fatty acid salts not generated in situ include the fatty acid salts of these same metals.

The invention also includes the utilization of combinations of fatty acid salt anions such as barium/calcium stearate, calcium/zinc stearate, barium/cadmium stearate and the like.

The polar substances utilized in the process of the present invention include alcohols and polyalcohols. In particular, the fatty alcohols and polyalcohols, and the ethoxylated alcohols, having hydroxy numbers (ASTM D 1957) greater than 90, and having about 10 to about 28 carbon atoms per molecule, are preferred. The upper limitation in hydroxy number is that it not be so great as to render the polar substance incompatible in the melt. One such polar substance may be utilized, or a mixture of such polar substances may be utilized. Specific examples of these fatty alcohols and polyalcohols are glycerol monostearate, stearyl alcohol, lauryl alcohol, and octylphenoxyethanol with 10 moles ethylene oxide, e.g., Triton X-100 of Rohm & Haas Corporation.

The process of this invention is hereinafter described with specific reference to the preparation of compositions based on calcium stearate, stearic acid, and calcium base materials, it being understood that the process and process conditions are generally equally applicable to the preparation of other compositions herein disclosed.

In the in situ process, the fatty acid, e.g., stearic acid, is mixed with one or more of the polar substances, the mixture is heated to at least 100° C. to form a homogeneous melt, and a finely divided metal base material, e.g. calcium oxide, is added thereto to produce calcium stearate-containing compositions. These compositions may be combined with hydrocarbon waxes, selected from microwaxes, paraffins and/or alpha-olefins, prior to the heating step, during the heating step or even sometime later, with reheating. The resulting compositions of matter have been found to be excellent extrusion lubrication compositions for the extrusion of thermoplastics.

The stearic acid or its functional equivalents and one or more polar substances are added together and heated to a temperature of at least 100° C. Agitation to enhance mixing is preferred, though not essential. In general, about 0.20 to about 2 parts by weight polar substance is used per part by weight of stearic acid. Preferably, about 0.4 to about 1.0 part by weight of the polar substance is used per part by weight of stearic acid. The mixture of the stearic acid and polar substances is heated to form a homogeneous melt. Preferably, temperatures of at least 100° C. are used, although the reaction does proceed at lower temperatures, but does so slowly and incompletely. In order to remove the water which is formed, temperatures of at least 100° C. advantageously yield dry products. Temperatures of 100° C. to about 150° C. may be employed, and temperatures slightly above 100° C. will effectively and advantageously produce the desired homogeneous melt, after which the addition of the calcium base will cause an exothermic reaction resulting in a temperature increase of 10° to 20° C. Temperatures of 110°–130° C. represent the optimum temperature range for addition of the calcium base.

A finely divided metal base material, e.g. calcium base, is added to the mixture of the stearic acid and polar substances. The form of the base should be a fine powder for increased rate of reaction. The optimum particle size is between 16 and 70 mesh. Larger particle sizes than 16 mesh react at slower rates. Particles smaller than 70 mesh can cause dusting problems and be more difficult to handle. This finely divided base material is selected from the group consisting of Group II or lead hydroxides, oxides, and mixtures thereof. Commercially available metal hydroxides and oxides may be employed, provided that they are adequately fine particulate material. For example, slaked lime or hydrated lime may be used. When calcium hydroxide (slaked lime) is used, two moles of water are formed per mole, whereas calcium oxide (quicklime) forms only one mole of water per mole, yielding a faster reaction with less foaming. In general, approximately stoichiometric amounts or slightly less than stoichiometric amounts of calcium base material are used to react with stearic acid, which in the case of stearic acid and calcium oxide translates into about 2 to 3 moles of stearic acid per mole of calcium oxide.

The base material may be added to the mixture of fatty acid, e.g., stearic acid, and polar substances (1) prior to heating (2) during the heating step while the homogeneous melt is being formed, or (3) afterward. If the base material is added prior to or during heating and formation of the homogeneous melt, the metal stearate or its equivalent is formed in situ during the heating. If the base material is added after the homogeneous melt has been formed and cooled, additional heat will be needed for the metal stearate or its equivalent to be formed in situ. In this case, heating to at least 100° C. is advantageous. When the reaction begins, an increase in temperature is observed due to the exothermic reaction.

When the metal stearate, e.g., calcium stearate, is generated in situ adequate stirring must be maintained to prevent the powdered base from settling to the bottom of the reactor vessel before reaction has occurred. The settled base can form a lump which has reduced surface contact and reduces the rate of reaction and even stops reaction before completion.

A calcium base reacts with stearic acid to form the theoretical amount of calcium stearate. When the blend is heated for longer periods of time, the acid number is found to decrease slowly to values less than the theoretical amount. A possible explanation for this is an interaction of the stearic acid with the alcohols to form an ester, thereby reducing the total stearic acid content. Whatever the cause, it can be avoided by processing the reacted product soon after the desired melt composition has been obtained.

As mentioned, this process of combining the fatty acid and the metal base material in the presence of one or more polar substances results in a superior product with in situ formation of the metal salt of the fatty acid. The resulting composition is combined with one or more low molecular weight carbon-containing compounds, and more specifically, hydrocarbon waxes selected from the group consisting of polyethylene waxes, microwaxes, paraffins and alpha-olefins, especially microwaxes and paraffins. These carbon-containing compounds may be added prior to, or during either of the aforementioned heating steps, or afterward. If it is combined afterward, additional heating to at least 100° C. may be necessary. In general, about 1 to about 90 parts by weight of the polyethylene waxes, microwaxes, paraffins and/or alpha-olefins may be used per corresponding 99 to 10 parts by weight of the above referenced composition.

Examples of specific hydrocarbon waxes are the polyethylene waxes having melting points of 100° to 130° C. and penetrations of 1 to 20 (ASTM No. D-1321); microwaxes having melting points of 60° to 90° C. and penetrations of 10 to 40; paraffins having melting points of 30° to 60° C. and penetrations 10 to 40; alpha-olefins having carbon chains of C-22 to C-35 and higher; and Fischer-Tropsch waxes. Preferred are blends having both microwaxes and paraffins.

As mentioned, the present invention processes also include the process of forming superior extrusion aides wherein the metal salt of the fatty acid is added directly with the other initial constituents rather than being formed in situ. In these embodiments, the fatty acid, the fatty acid salt, the polar substances and the microwaxes, paraffins and alpha-olefins are combined in predetermined amounts. In general, about 0.2 to about 2 parts by weight of polar substance is included per part by weight of the metal salt of the fatty acid, and preferably about 0.4 to about 1.0 parts by weight is used. In addition, about 0.05 to about 0.4 moles of fatty acid per mole of the metal salt of the fatty acid is also added, especially about 0.1 to about 0.2 moles. The polyethylene waxes, microwaxes, paraffins and/or alpha-olefins are included in the same amounts as specified above.

These components are combined in any order, and are heated to 100° to 150° C. under agitation, as set forth above for the in situ process.

Often a gell-like dispersion can be observed which separates when agitation of the melt is stopped at high levels of hydrocarbon wax dilution and low free fatty acid levels and polar substance levels (<0.2 moles), but a uniform dispersion results when agitation resumes. Known stabilizers and other additives may be employed in conjunction with any of the present invention compositions, including the stabilizers and additives generally and specifically disclosed in U.S. Pat. No. 4,248,747, issued on Feb. 3, 1981, to Washecheck et al and assigned to Conoco, Inc., which patent is incorporated herein by reference in its entirety.

In the preferred embodiment, the composition of matter of the present invention, prior to the addition of the hydrocarbon waxes, contains calcium stearate, stearic acid, and one of more of the above-stated polar substances, as the principal important components. In particular, the amounts by weight based on the total weights of these three components are about 30 to about 80% by weight of calcium stearate, about 1.0 to about 30% by weight of stearic acid and about 20 to about 60% by weight of the polar substances. These relative amounts may be about the same after the hydrocarbon waxes are included. In general, about 1 to about 90% by weight of the hydrocarbon waxes are included.

Preferably, the four component composition of matter of the present invention contains about 15 to about 40% by weight of calcium stearate, about 1 to about 10% by weight of stearic acid, about 10 to about 35% by weight of the polar substances, and about 20 to about 70% of the hydrocarbon waxes, based on the total weight of these components.

Vinyl chloride resins which may be beneficially processed according to this invention are those well known materials which may be heat formed to provide useful shaped articles, such as by calendering, injection molding or extrusion. These include polyvinyl chloride or polyvinylidene chloride, chlorinated polyvinyl chloride and copolymers or terpolymers of vinyl chloride with minor amounts of different comonomers such as vinylidene chloride, vinyl acetate and other copolymerizable monomers. These resinous compositions may also contain other well known additives such as pigments, fillers, heat stabilizers and the like.

The lubricant may be employed at a level generally within the range of 0.3 to 5.0 parts per 100 parts vinyl chloride resin. In cases where the lubricant contains no additional hydrocarbon wax, the preferred range is about 0.3 to 3 parts by weight, whereas lubricants containing the hydrocarbon wax are advantageously employed at the level of 0.5 to 5 parts by weight per hundred parts resin. In most cases the lubricant is found quite effective at a level in the range of about 0.3 to 3.0 parts per 100 parts resin. The resin, lubricant and any other ingredients may be mixed prior to heat processing or forming by any method which will insure as homogeneous a mixture as possible, e.g., by dry mixing the ingredients in solid flake or powder form, by forming a homogeneous melt, or by metering in the additives in a mixer/extruder.

In addition to their use as extrusion aids, the lubricant compositions of this invention may also be used as nucleating agents, metal powder lubricants, mold release agents, heat stabilizers and like applications where materials such as relatively pure calcium stearate are currently being used.

The invention is more specifically described with reference to the examples below wherein all parts and percentages are by weight unless otherwise specified. The examples are provided to illustrate the present invention and the present invention should not be construed to be limited thereto.

EXAMPLE 1

A composition of the present invention is prepared, as follows:

2057 g of a microcrystalline wax (congealing point 76°–82° C., hardness at 25° C. 16–26), 2057 g of a linear alcohol having chain length predominantly between $C_{18}$ and $C_{26}$ (hydroxy number 115–130, melt range 45°–57° C.), and 2469 g stearic acid (congealing point 50°–55° C., acid number 195–205) were charged to a steam heat reactor vessel and were heated to 110° C. and agitated. Next about 256 g of a commercial pulverized quicklime was added under agitation. An exothermic reaction occurred causing an increase of temperature to about 130° C. When the reaction was completed, the melt was somewhat thick but still flakable and had an acid number of 5.7.

The starting materials were thus utilized in the following proportions:

| | |
|---|---|
| Microcrystalline Wax | 30% |
| $C_{18}$–$C_{26}$ Linear Alcohol | 30% |
| Stearic Acid | 36% |
| Quicklime | 4% | and the resulting composition was found to contain the following:

| | |
|---|---|
| Microcrystalline Wax | 30% |
| $C_{18}$–$C_{26}$ Linear Alcohol | 30% |
| Calcium Stearate | 37% |
| Stearic Acid | 3% |

EXAMPLE 2 150 g of the $C_{18}$ to $C_{26}$ linear alcohol and 180 g stearic acid were melted and heated to 120° C. 18.5 g calcium oxide was added with agitation. After 1½ hours of heating, the thick but pourable melt had an acid number of 9.6. To 60 parts by weight of this composition was added 40 parts by weight of a mixture of 10 parts, polyethylene wax and 30 parts hydrocarbon waxes (melting range 75°–85° C.) to yield an advantageous lubricant aide.

EXAMPLE 3

120 g calcium stearate, 60 g $C_{18}$–$C_{26}$ linear alcohol and 25 g stearic acid were blended to give a slightly thick but flakable melt at 120° C. with an acid number of 24, having 29% alcohol, 59% calcium stearate and 12% stearic acid.

EXAMPLE 4

343 g of an oxidized polyethylene (acid number 10–20) was added to the melt of Example 1 to form a homogeneous melt with melt and final composition properties similar to that of Example 1.

EXAMPLE 5

An organic tin compound of the type commonly used for stabilization of PVC was added to an alliquot of the melt of Example 4 to give a blend containing 15% organic tin. The resulting melt was slightly lower in viscosity than that of Example 4, while the solid material was somewhat softer with a slightly tacky feel but nevertheless flakable. The composition is an advantageous lubricant aide for the extrusion of PVC, containing all the conventional components of lubricants and stabilizer needed for extrusion of PVC.

EXAMPLE 6

50 g of linear alcohol having chain length predominantly between $C_{18}$ and $C_{26}$ melting in the range of 45°–57° C. was heated to 135° C. 55 g of calcium stearate was slowly added with stirring to form a clear dispersion having a moderately low viscosity.

EXAMPLE 7

Five grams of stearic acid was added to the blend in Example 6 to give a melt of reduced viscosity, enabling the addition of an additional 15 g calcium stearate while still maintaining a low viscosity melt.

EXAMPLE 8

The procedure of Example 6 is repeated using a linear $C_{12}$–$C_{18}$ alcohol. 70 g of calcium stearate could be incorporated before the viscosity became too great. An additional 5 g of stearic acid was added, which enabled the addition of 5 g more of calcium stearate.

EXAMPLE 9

The same procedure as Example 6 was followed, using glycerol mono stearate as the alcohol, which required the addition of 75 g. of calcium stearate before the melt became thick. Addition of 5 g. stearic acid enabled the addition of 5 more grams of calcium stearate, to yield a desired product.

EXAMPLE 10

100 g of a hydrocarbon wax (melting range 76°–84° C., hardness 15–28) was added to the melt of each product which was obtained by Examples 7–9. Uniform melts resulted, having somewhat lower viscosities than the original melts.

EXAMPLE 11

When the blends of Examples 6–10 were diluted in the hydrocarbon wax and left undisturbed, a thin gel-like material settled out from the wax melt. This is apparently a colloidal dispersion of calcium stearate/alcohol/wax. A homogeneous dispersion was reestablished by gentle agitation of the melt.

EXAMPLE 12

Stearic acid (142 g) and a $C_{18}$–$C_{26}$ linear alcohol (110 g) were melted together and heated to 125° C. Magnesium hydroxide (13.1 g) was slowly added with stirring. Foaming was observed during the addition. When the addition was complete and the foaming had stopped, infrared analysis showed the presence of only small amounts of free acid with strong absorption at 1590 $cm^{-1}$ which is characteristic of organic metal salts.

EXAMPLE 13

The procedure in Example 12 was repeated using 34.5 g barium oxide. Foaming was noted during addition. Infrared spectra showed strong absorption at 1520 cm$^{-1}$ indicating the formation of a metal salt.

EXAMPLE 14

The procedure in Example 13 was repeated using glycerol monostearate in place of the $C_{16}$–$C_{26}$ alcohol. The reaction proceeded as above.

EXAMPLE 15

The procedure in Example 12 was repeated using zinc oxide (17.08 g). Moderate foaming occurred over a 2 hour period of heating. The melt remained very milky in appearance indicating the zinc oxide had not reacted.

However, infrared analysis showed strong absorption at 1540 cm$^{-1}$ (metal stearate) and also at 1730 cm$^{-1}$ and 1180 cm$^{-1}$.

It is believed that the zinc, in addition to forming a salt with stearic acid can also act as a catalyst to form esters from a portion of the stearic acid and alcohols.

EXAMPLE 16

The procedure in Example 12 was repeated using lead oxide, monoyellow (50.2 g). When added, a yellow color formed in the melt and then faded. Moderate foaming was noted.

EXAMPLE 17

A blend of the following polyvinyl chloride (PVC) resin composition was prepared:

| | |
|---|---|
| PVC resin | 100 parts |
| Lubricant | 2 phr |
| Calcium carbonate | 3 phr |
| Titanium dioxide | 1 phr |

Five different lubricant blends were prepared and evaluated on a torque Rheometer (Haake Rheocord EU-3V) at 180° C., 60 rpm, using a 65 g charge.

| | A | B | C | D | E |
|---|---|---|---|---|---|
| Lubricant composition | | | | | |
| Calcium stearate | 40 | 40 | 40 | 40 | 40 |
| Microcrystalline wax | 40 | 40 | 40 | 40 | 40 |
| Stearic acid | 20 | — | — | — | — |
| 12-hydroxystearic acid | — | 20 | — | — | — |
| -$C_{18}$-$C_{26}$ alcohol | — | — | 20 | — | — |
| -Stearyl alcohol | — | — | — | 20 | — |
| -Glycerol monostearate | — | — | — | — | 20 |
| Torque Rheometer Results | | | | | |
| Lubricant | A | B | C | D | E |
| Fusion time (min) | 5.7 | 5.3 | 3.6 | 3.1 | 3.1 |
| Fusion torque (MG) | 1830 | 1860 | 2000 | 2130 | 2070 |
| Equil. torque (MG) | 1700 | 1750 | 1800 | 1830 | 1830 |

Lubricants A and B which contain the excess acid functional groups have longer fusion times and lower fusion torques. Lubricants C, D and E show better fusion characteristics. Compositions A through E can be blended with hydrocarbon waxes as described in Examples 1 and 2.

EXAMPLE 18

A lubricant composition as described in Example 2 was blended with PVC to yield the following approximate composition:

| | |
|---|---|
| PVC resin | 100 parts |
| Heat stabilizer | 0.4 parts |
| Lubricant | 1.7 parts |
| $CaCO_3$ | 3.0 parts |
| $TiO_2$ | 1.0 parts |

The resin and stabilizer were added at room temperature, the mixer was started and the mixture was heated. When the temperature reached 70° C., the filler and $TiO_2$ were added. At 80° C., the mixed lubricant composition was added and mixing continued. The blended composition was removed from the mixer and allowed to cool to room temperature before extrusion.

The extruder employed was a conical 50/25 mm twin screw extruder. The screws are oil heated and counter rotating. A standard one inch pipe die head was employed. The temperature profile in the extruder for all runs was: screw about 160° C., barrel zones about 170° to 180° C., and die zone of about 190° C.

Pipe comparable to that produced by conventional lubricant compositions (1.1 parts paraffin wax, 0.4 parts calcium stearate and 0.2 parts oxidized polyethylene wax) was produced.

What is claimed is:

1. A composition of matter consisting essentially of a mixture of (i) from about 1 to about ninety parts by weight of one or more hydrocarbon waxes per 99 to 10 parts by weight of (ii) an additive which consists essentially of
   (A) from about 30 to 80% by weight of a Group II or lead metal salt of an alkyl fatty acid having from 12 to 30 carbon atoms;
   (B) from about 1 to 30% by weight of a fatty acid having from 12 to 30 carbon atoms; and
   (C) from about 20 to 60% by weight of one or more polar substances selected from the group of fatty monoalcohols and glycerol monostearate.

2. The composition of claim 1 wherein said metal salt is selected from the group consisting of calcium, magnesium, barium, zinc, cadmium and lead salts, and mixtures thereof.

3. A composition of matter consisting essentially of (i) from about 1 to about ninety parts by weight of one or more hydrocarbon waxes per 99 to 10 parts by weight of (ii) an additive which consists essentially of
   (A) from about 30 to 80% by weight of calcium stearate;
   (B) from about 1% to about 30% by weight of stearic acid; and
   (C) from about 20% to about 60% by weight of one or more polar substances selected from the group consisting of fatty monoalcohols and glycerol monostearate.

4. The composition of claim 3, comprising:
   (a) about 15% to about 40% by weight of calcium stearate;
   (b) about 1% to about 10% by weight of stearic acid;
   (c) about 10% to about 35% by weight of said polar substances; and,
   (d) about 20% to about 70% by weight of said hydrocarbon waxes.

5. The composition of claim 3 wherein said polar substance is a linear aliphatic monoalcohols having a chain length predominantly between $C_{18}$ and $C_{26}$.

6. A process for producing a composition of matter, comprising:
  (A) mixing an alkyl fatty acid having from 12 to 30 carbon atoms with one or more polar substances selected from the group consisting of fatty monoalcohols and glycerol monostearate; and prior to or during step (b), adding one or more hydrocarbon waxes selected from the group consisting of polyethylene waxes, microwaxes, paraffins and alpha-olefins to said mixture,
  (B) heating the mixture to a temperature of at least 100° C. and below 150° C. to form a homogeneous melt, and
  (C) adding thereto a finely divided Group II metal or lead compound selected from the group consisting of the metallic hydroxide, oxide and mixtures thereof, so as to produce a fatty acid metal salt-containing composition.

7. The process of claim 6 wherein said fatty acid is stearic acid and wherein said compound is a calcium base material selected from the group consisting of calcium oxide, calcium hydroxide, and mixtures thereof.

8. The process of claim 7 wherein said polar substances are selected from the group consisting of monoalcohols and glycerol monostearate having about 10 to about 30 carbon atoms per molecule, and wherein said heating is to a temperature within the range of about 100° C. to about 150° C.

9. The process of claim 7 wherein about 2 to 3 moles of stearic acid are used per mole of calcium base material.

10. The process of claim 9 wherein about 0.2 to about 2 parts by weight of polar substances are used per part by weight of stearic acid.

11. A process for producing a composition of matter comprising:
  (a) combining the following components:
    (i) calcium stearate
    (ii) one or more polar substance selected from the group consisting of fatty monoalcohols and glycerol monostearate; and
    (iv) one or more hydrocarbon waxes selected from the group consisting of polyethylene waxes, microwaxes, paraffins and alpha-olefins; and
  (b) heating said components to a temperature of at least 100° C. and below 150° C. under agitation.

12. The process of claim 11 wherein said one or more polar substances is selected from the group consisting of monoalcohol and glycerol monostearate having about 10 to 30 carbon atoms.

13. The process of claim 11 wherein said components are combined as follows:
  (a) about 30% to about 80% by weight of calcium stearate;
  (b) about 1.0% to about 30% by weight of stearic acid;
  (c) about 20% to about 60% by weight of said polar substances; and,
  (d) about 1 to about 90 parts by weight of said hydrocarbon waxes per about 99 to about 10 parts by weight of the mixture of (a), (b) and (c).

14. A vinyl chloride resin composition comprising an intimate mixture of vinyl chloride resin and about 0.3 to 5.0 parts by weight of the lubricant composition of claim 1 per 100 parts by weight of vinyl chloride resin.

15. A method of lubricating vinyl chloride resin during extrusion comprising the addition thereto, prior to or during said extrusion, of from 0.5 to 5 percent by weight based upon the total weight of the lubricated resin of an extrusion lubricant consisting essentially of
  (i) from about 1 to ninety parts by weight of one or more hydrocarbon waxes per 99 to 10 parts by weight of
  (ii) an additive which consists essentially of
    (A) from about 30 to 80% by weight of a Group II or lead metal salt of an alkyl fatty acid having from 12 to 30 carbon atoms;
    (B) from about 1 to 30% by weight of a fatty acid having from 12 to 30 carbon atoms and
    (C) from about 20 to 60% by weight of one or more polar substances selected from the group consisting of fatty monoalcohols and glycerol monostearate.

* * * * *